US012560200B2

(12) United States Patent
Köching

(10) Patent No.: US 12,560,200 B2
(45) Date of Patent: Feb. 24, 2026

(54) SLIDING BEARING WITH A MULTI-PART CARRIAGE

(71) Applicant: igus SE & Co. KG, Cologne (DE)

(72) Inventor: Fabian Köching, Rhede (DE)

(73) Assignee: igus SE & Co. KG, Cologne (DE)

( * ) Notice: Subject to any disclaimer, the term of this patent is extended or adjusted under 35 U.S.C. 154(b) by 0 days.

(21) Appl. No.: 18/286,117

(22) PCT Filed: Apr. 8, 2022

(86) PCT No.: PCT/EP2022/059518
§ 371 (c)(1),
(2) Date: Oct. 23, 2023

(87) PCT Pub. No.: WO2022/218878
PCT Pub. Date: Oct. 20, 2022

(65) Prior Publication Data
US 2024/0183389 A1 Jun. 6, 2024

(30) Foreign Application Priority Data
Apr. 12, 2021 (DE) ..................... 20 2021 101 948.4

(51) Int. Cl.
*F16C 29/02* (2006.01)
*F16C 43/02* (2006.01)

(52) U.S. Cl.
CPC .............. *F16C 29/02* (2013.01); *F16C 43/02* (2013.01)

(58) Field of Classification Search
CPC ...... F16C 29/005; F16C 29/007; F16C 29/02; F16C 2208/02; F16C 2220/04
See application file for complete search history.

(56) References Cited

U.S. PATENT DOCUMENTS 6,113,275 A    9/2000   Blase
6,179,468 B1 *  1/2001   Thorstens ............... F16C 29/02
                                              384/40
(Continued)

FOREIGN PATENT DOCUMENTS

CN        108150534 A  *  6/2018
DE   20 2004 016 094 U1    3/2006
(Continued)

OTHER PUBLICATIONS

European Patent Office, International Search Report for PCT App. No. PCT/EP2022/059518, Aug. 5, 2022, pp. 1-3.
(Continued)

*Primary Examiner* — James Pilkington
(74) *Attorney, Agent, or Firm* — Cahn & Samuels, LLP

(57) ABSTRACT

A sliding bearing includes a carriage having a carriage body with a bushing extending along a longitudinal axis and a sliding element arranged in the bushing so as to bear against the carriage body to at least partially enclose a sliding opening in the bushing and is designed to receive a cylindrical guide portion of a rail extending in an elongate manner along the longitudinal axis. The carriage body includes two carriage elements arranged next to one another along the longitudinal axis and are releasably fixed to one another, each of the carriage elements forms a longitudinal portion of the bushing. Each of the carriage elements forms a stop along the longitudinal axis for the sliding element. At least one portion of the sliding element is fixed in its position along the longitudinal axis between these stops.

18 Claims, 1 Drawing Sheet

(56)     References Cited

U.S. PATENT DOCUMENTS

| 6,287,008 | B1 * | 9/2001 | Bartelmuss | .......... | B65H 23/038 |
| | | | | | 384/42 |
| 11,530,719 | B2 * | 12/2022 | Niermann | ............. | G01M 13/04 |
| 2006/0083447 | A1 | 4/2006 | Moshammer | | |
| 2008/0247692 | A1 | 10/2008 | Schroeder | | |
| 2024/0392831 | A1 * | 11/2024 | Köching | ................. | F16C 29/10 |

FOREIGN PATENT DOCUMENTS

| JP | S4412002 | B1 | 5/1969 |
| JP | 3014154 | U | 5/1995 |
| JP | 2001355643 | A | 12/2001 |
| JP | 2009286164 | A | 12/2009 |
| JP | 2011231783 | A | 11/2011 |
| KR | 10-1916208 | B1 | 11/2018 |
| WO | 97/40281 | A1 | 10/1997 |

OTHER PUBLICATIONS

European Patent Office, Written Opinion for PCT App. No. PCT/EP2022/059518, Aug. 5, 2022, pp. 1-6.

Deutsches Patent-und Markenamt, Search Report for DE App. No. 20 2021 101 948.4, Nov. 11, 2021, pp. 1-5.

European Patent Office, English abstract for KR101916208B1, printed on Oct. 5, 2023.

European Patent Office, English translation of the Written Opinion for PCT App. No. PCT/EP2022/059518, Oct. 12, 2023, pp. 1-5.

Japanese Patent Office, Office Action for Japanese App. No. JP2023561811, Apr. 1, 2025, pp. 1-11.

European Patent Office, English abstract for JP2009286164A, retrieved on Apr. 16, 2024.

European Patent Office, English abstract for JP2001355643A, retrieved on Apr. 16, 2024.

European Patent Office, English abstract for JP2011231783A, retrieved on Apr. 16, 2024.

Japanese Patent Office, English abstract for JP3014154U, retrieved on Apr. 16, 2024, pp. 1-2.

* cited by examiner

SLIDING BEARING WITH A MULTI-PART CARRIAGE

FIELD OF THE INVENTION

The invention relates to a plain bearing and to a plain bearing assembly with such a plain bearing and use of such a plain bearing.

BACKGROUND OF THE INVENTION

Generic plain bearings are sufficiently well known in the prior art and are used for sliding guidance of working devices, in particular as a linear guide. Depending on the field of application, such working devices may have the most varied properties. For example, such working devices may be elements of a fitness apparatus, machine tools, such as for example saws, or holding means, for example for displays. In every case it comes down to the plain bearing enabling maximally friction-free and wear-free guidance of the working device attached thereto along a rail. A plain bearing of the type in question is described, for example, in DE 20 2004 016 094 U1.

A plain bearing of the type in question comprises a carriage, having a carriage body, in which a passage running along a longitudinal axis through the carriage element is provided. In the passage, a sliding element is arranged resting against the carriage element, which sliding element encloses a sliding opening situated within the passage. The plain bearing is configured to receive a cylindrical guide portion of a rail in such a way in the sliding opening that the cylinder axis thereof extends along the longitudinal axis, in particular coincides therewith, and the guide portion received in the sliding opening is enclosed at least in portions by the sliding element, thereby ensuring sliding guidance of the carriage on the rail. The carriage and thus the plain bearing may accordingly be displaced along the cylinder axis of the guide portion relative to the rail, while the carriage rests against the guide portion of the rail solely via the sliding element or a plurality of sliding elements. The opening and the sliding element preferably enclose the longitudinal axis and thus also the cylindrical guide portion received in the sliding opening over an angular range of at least 200°, in particular at least 220°, in particular at least 240°, in particular at least 260°. In this way, it is ensured that the carriage also is held reliably on the guide portion of the rail even on exposure to an external force acting perpendicularly to the longitudinal axis between the rail and the carriage. Through corresponding configuration of the sliding element, it is furthermore preferably ensured that, even under any external force acting between the rail and the carriage perpendicular to the longitudinal direction, the carriage always rests against the guide portion of the rail solely via the sliding element.

In the case of a plain bearing assembly of the type in question, comprising a carriage and a rail, the guide portion of the rail is received in the sliding opening of the carriage. The guide portion is preferably configured as a cylinder extending with its cylinder axis along the longitudinal axis. The guide portion preferably has a lengthwise extent along the longitudinal axis which is substantially greater than the lengthwise extent of the carriage along the longitudinal axis, in particular amounts to at least ten times, in particular at least twenty times, this lengthwise extent of the carriage. A plain bearing assembly of the type in question is thus generally preferably configured as a linear guide and serves in linear, sliding guidance of a working device which is attached to the carriage, while the rail is attached in a fixed position to a component.

In the case of plain bearings of the type in question, sliding elements made from plastics material are conventionally used, in particular sliding elements made from a tribopolymer. This enables lubricant-free sliding guidance of the plain bearing on a rail. However, such sliding elements are subject to wear. Depending on loading of the working device attached to the carriage and depending on the distance traveled by the carriage along the rail, a sliding element may experience such wear as to make replacement of the sliding element necessary. To replace such a sliding element, typically the working device has to be detached from the carriage and then the carriage has to be pulled off the rail along the longitudinal axis, after which the sliding element is accessible and can be removed from the carriage element and replaced by a new sliding element. However, this requires considerable effort. Because of the load exerted on the carriage by the working device and the enclosed arrangement of the sliding element in the passage of the carriage, simple replacement of the sliding element and thus simple maintenance of the plain bearing is not possible with plain bearings of the type in question.

SUMMARY OF THE INVENTION

It is an object of the present invention to provide a plain bearing and a plain bearing assembly and use of a plain bearing with which at least one disadvantage of the plain bearing of the type in question can be remedied at least in part.

As one way of achieving the stated object underlying the present invention, the invention proposes a plain bearing. The plain bearing according to the invention comprises, as in the case of the above-explained plain bearing of the type in question, a carriage, having a carriage body with a passage running along a longitudinal axis, wherein a sliding element resting against the carriage body is arranged in the passage, which sliding element at least in portions encloses a sliding opening situated within the passage, which opening is suitable for receiving a cylindrical guide portion of a rail extending along the longitudinal axis. The plain bearing according to the invention may have further features which are explained in connection with plain bearings of the type in question. According to the invention, the carriage body has two carriage elements arranged next to one another along the longitudinal axis and fixed detachably to one another, each of which forms a longitudinal portion of the passage. A longitudinal portion of the passage is a portion of the passage along the longitudinal axis, wherein the longitudinal axis runs in the longitudinal direction and thus each orientation along the longitudinal axis is an orientation in the longitudinal direction. Each of the carriage elements forms a respectively different longitudinal portion of the passage. Each of the carriage elements forms a limit stop, acting along the longitudinal axis, for the sliding element, wherein at least one portion of the sliding element is fixed in position along the longitudinal axis between these limit stops, which are formed by the two carriage elements. The sliding element may, for example, be arranged wholly between the two limit stops. For example, the sliding element may have a projection which forms the stated portion of the sliding element and is thus arranged along the longitudinal axis between the limit stops and is thus fixed with regard to movement play to the region extending longitudinally between the limit stops.

The sliding element is preferably arranged in each of the two longitudinal portions of the passage formed by the two carriage elements. The sliding element may for example have two separate sliding subelements, wherein each of the subelements is arranged in a respectively different one of the two longitudinal portions of the passage formed by the two carriage elements and wherein each of the sliding subelements in each case forms a subportion of the portion of the sliding element which is fixed in position along the longitudinal axis between the limit stops formed by the two carriage elements. The sliding element is particularly, preferably of a one-piece construction, which particularly simplifies the production and maintenance of the plain bearing, in particular replacement of the sliding element. By fixing the position of the stated portion of the sliding element between the limit stops, the position of the sliding element as a whole, in relation to the longitudinal axis, is at all times fixed relative to the carriage.

The plain bearing according to the invention is associated with significant advantages over generic plain bearings. By forming the carriage body of two carriage elements, which are arranged adjacent one another along the longitudinal axis and fixed detachably to one another such that they can be moved away from one another along the longitudinal axis, access to the sliding element arranged in the passage is ensured when the carriage elements are moved apart from one another. Furthermore, by providing the two carriage elements, the carriage limit stops can be simply provided, these preventing displacement of the sliding element along the longitudinal axis relative to the carriage when the plain bearing is in the intended state in which the carriage elements are fixed to one another, but no longer entailing any restriction of movement of the sliding element once the carriage elements have been moved apart, such that the sliding element can then be replaced. Furthermore, the configuration according to the invention of the carriage enables a working device fastened to the carriage to remain fastened to one of the carriage elements while the other one of the carriage elements is detached from the working device and displaced along the longitudinal axis relative to the one carriage element and to the working device, in particular while it is guided on the guide portion of a rail. Ongoing guidance of the other carriage element makes assembly of the carriage, i.e., re-joining together of the carriage elements, particularly simple. In general, the sliding element preferably has a slot extending along the entire longitudinal axis, such that the sliding element can be removed radially from said cylindrical guide portion if it is located along the longitudinal axis between the carriage elements. In one embodiment, the carriage elements form longitudinal portions of the passage of identical length. In another embodiment, one of the carriage elements forms with its longitudinal portion more than 80% of the lengthwise extent of the passage along the longitudinal axis, wherein the sliding element is preferably arranged only in the longitudinal portion formed by this carriage element and the other one of the carriage elements is fastened to the one carriage element merely in the manner of a cover, forming a limit stop for the sliding element.

In one embodiment, the sliding element and the carriage are configured in such a manner relative to one another that the only way to remove the sliding element from the passage without radial compression is to perform this after the carriage elements have been detached from one another and the carriage elements have been moved apart from one another along the longitudinal axis and thus in the longitudinal direction. In the intended operating state of the plain bearing, the sliding element can therefore at best—if at all—be removed from the passage after undergoing prior radial compression, by which said portion of the sliding element is moved radially to the outside of the limit stops formed by the carriage. In one embodiment, in the event of such a cylindrical guide portion being arranged in the sliding opening, which guide portion is spaced in each case by less than 0.3 mm from the sliding element at four circumferential portions offset with regard to rotational angle by in each case 60° about the longitudinal axis, the sliding element is removable from the passage solely once the carriage elements have been detached from one another and moved apart from one another along the longitudinal axis. The described preferred embodiments on the one hand enable reliable fixing of the sliding element relative to the carriage, and on the other hand furthermore enable simple removability of the sliding element once the carriage elements have been detached and moved apart from one another. In one embodiment, the carriage elements and the sliding element are configured in such a manner relative to one another that, in the event of such a cylindrical guide portion of the rail being arranged in the sliding opening, which guide portion has such a diameter that it rests in against the sliding element at each of two radially opposing ends, once the carriage elements have been detached from one another the carriage elements may each be moved apart from one another along the longitudinal axis while being guided by the respective longitudinal portion of the passage, which they respectively form on the guide portion of the rail, and while the sliding element remaining arranged on one of the two carriage elements until the other one of the carriage elements is spaced from the sliding element along the longitudinal axis, and then the sliding element may be removed from the one carriage element along the longitudinal axis. The carriage elements may thus preferably be moved away from one another while being guided by the longitudinal portions of the passage, which they form, respectively, on the cylindrical guide portion along the longitudinal axis, while the sliding element remains arranged on one of the carriage elements. As soon as the carriage elements are sufficiently spaced apart from one another, such that the sliding element now only being arranged on one of the carriage elements is radially accessible, the sliding element may be removed from this carriage element by pulling it along the longitudinal axis out of the longitudinal portion of the passage formed by this carriage element. It is generally preferable for the carriage elements to enclose the longitudinal axis over an angular range of at least 200°, in particular at least 220°, in particular at least 240°, in particular at least 260°, in each case in the longitudinal portion, formed thereby, of the passage. It is generally preferable for the sliding element to enclose the longitudinal axis over an angular range of at least 200°, in particular at least 220°, in particular at least 240°, in particular at least 260°, in particular in each of the longitudinal portions, formed by the two carriage elements, of the passage. This enclosure is preferably uninterrupted enclosure over the stated angular range. Preferably, said enclosure is over at least 50%, in particular at least 80%, in particular at least 90% of the total length of the passage along the longitudinal axis and/or the length of the sliding element along the longitudinal axis. This enclosure ensures particularly reliable sliding fixing and mounting of the plain bearing on a cylindrical guide portion.

In one embodiment, the sliding element has a shell part which is configured in the manner of a hollow cylinder, in particular in the manner of a hollow cylinder interrupted by a slot running along the longitudinal axis. This slot enables radial accessibility of the sliding opening. Through the provision of a slot, the sliding element may preferably be clipped radially onto a cylindrical guide portion. The shell part forms the sliding opening with its radial inner side. The internal cross-section of the hollow cylinder thus corresponds to the cross-section of the sliding opening. Particularly, preferably, a projection assembly running around the longitudinal axis is formed on a radial outer side of the shell part and is arranged along the longitudinal axis between the limit stops formed by the two carriage elements. The projection assembly may, for example, be configured to run continuously about the longitudinal axis over a fixed angular range, in particular a preferably large angular range as explained above, or have projection portions spaced from one another in the circumferential direction, these preferably being distributed over a correspondingly large angular range (preferably at least 200°, preferably at least 240°, preferably at least 260°, as explained above). The projection assembly is arranged at least in part along the longitudinal axis between the limit stops formed by the two carriage elements. The projection assembly may, for example, have some projection portions which are arranged between the limit stops, and at least one further projection portion which is arranged outside the limit stops. This further projection portion may, for example, fulfill a different function from the other projection portions, for example bringing about rotational locking, thereby being configured as an antitwist portion. In general, the projection assembly preferably has a plurality of projection portions arranged distributed about the longitudinal axis, at least one of which is configured as an antitwist portion and is arranged between two further limit stops of the carriage acting perpendicular to the longitudinal direction and spaced from one another in a direction of rotation about the longitudinal axis. By arranging the antitwist portion between the further limit stops of the carriage, a rotational position of the sliding element relative to the carriage is thus fixed in relation to rotation about the longitudinal axis. The carriage elements particularly, preferably together form each of the further limit stops, such that each of the carriage elements in each case forms part of each of the further limit stops. Particularly, preferably, all the projection portions of the projection assembly are arranged along the longitudinal axis between said limit stops of the carriage.

Particularly, preferably, the carriage elements together form, at their ends facing one another along the longitudinal axis, a groove running around the longitudinal axis and forming the limit stops of the two carriage elements. The groove preferably runs uninterrupted about the longitudinal axis, preferably over an advantageous large angular range as indicated above. Said portion of the sliding element is thus arranged within the groove. The portion is preferably formed by the projection assembly. The projection assembly is accordingly preferably arranged at least in part in the groove, namely at least with that part with which it forms said portion of the sliding element. Particularly, preferably, the antitwist portion, in relation to a direction along the longitudinal axis, is arranged in the groove. The carriage preferably has a recess which opens into the passage, wherein the antitwist portion of the sliding element is arranged in the recess. The recess opens in the radial direction into the passage, such that the antitwist portion extends from the passage radially into the recess. The recess is preferably arranged within said groove in a direction along the longitudinal axis, such that the recess opens into the groove. Alternatively or in addition, the recess preferably forms a continuous connection from an outer side of the carriage to the passage.

It is generally preferred for the carriage elements to be configured in one piece, particularly, preferably made in one piece from a metal or a metal alloy. The carriage elements are preferably made using die-casting. It is generally preferred for the sliding element to be made from a tribological polymer, in particular made in one piece from the tribological polymer, in particular using injection molding. Such a tribological polymer is a polymer optimized with respect to wear reduction and friction reduction. Such a tribological polymer conventionally has a base polymer, for example the thermoplastics polyethene, polypropylene, polyacetal, polycarbonate, polyamide, polyvinyl chloride, polytetrafluoroethene and, in the case of thermosets, phenolic resins. To this base polymer are added finely divided solid lubricants, for example molybdenum disulfide or graphite, and/or fillers, for example, plastics material or textile fibers or particles. It is generally preferred for the sliding element to have flutes running along the longitudinal axis on the inner side of its shell part. These flutes may on the one hand prevent elevated friction due to soiling between sliding element and guide portion of a rail, and on the other hand due to the flutes the sliding element may have preferred radially elastic properties and preferably a contact surface of the sliding element against the guide portion may be reduced.

In one embodiment, the plain bearing has at least one peg, which extends along the longitudinal axis. The peg is fixed to a side of one of the carriage elements which faces toward the other carriage elements and thus faces along the longitudinal axis. The peg is arranged in a hole-type, in particular blind hole-type, indent, which is provided on the side of the other element facing toward the one carriage element. The peg accordingly engages in this indent to fix the position of the carriage elements relative to one another perpendicular to the longitudinal axis. A rotational position of the carriage elements relative to one another, in relation to rotation about the longitudinal axis, may for example be clearly fixed when a cylindrical guide portion is located in the passage of the carriage. The plain bearing preferably has two pegs spaced from one another perpendicular to the longitudinal axis, wherein the provision of two pegs makes it possible to fix the rotational position clearly, wherein these pegs, as explained in relation to the one peg, are arranged on the side of one of the carriage elements and in each case engage in an indent which is arranged on the other one of the carriage elements. The peg is preferably fixed to the one carriage element by providing a hole-type, in particular blind hole-type, indent on said side of this one carriage element into which the peg is inserted. Fixing of the peg relates to fixing perpendicular to the longitudinal axis. The peg preferably has substantially the same cross-section as the hole-type indent, such that the peg is held with as little play as possible in the indent. By providing the one peg or plurality of pegs, intended joining together of the carriage elements to produce the carriage may be particularly simplified and the robustness of the carriage particularly enhanced.

In one embodiment, the plain bearing has a screw extending along the longitudinal axis, which presses with its screw head along the longitudinal axis against an outer side of one of the carriage elements and which extends with its threaded pin through this one carriage element and is screwed into a threaded hole provided in the other one of the carriage elements. In this way, reliable detachable fixing of the carriage elements to one another can be ensured.

In one embodiment, the carriage comprises a fastening device for fastening a working device to the carriage. The fastening device has a supporting face for the working device lying in a plane and having two subareas, wherein each of the carriage elements forms one of the subareas, respectively. Alternatively or in addition, the carriage may have at least one channel running perpendicular to the longitudinal axis, in particular at least two channels running perpendicular to the longitudinal axis, for receiving a fastening means for fastening the working device to the carriage. The fastening means may for example be a screw which is screwed through the channel into a corresponding thread of the working device and which presses with its screw head against the carriage such that the working device is fixed to the carriage via the fastening means. With each of the carriage elements having a subarea of the supporting surface and/or each of the carriage elements having one of the two channels, the working device may be fastened to both carriage elements. Accordingly, one of the carriage elements may be detached from the working device and moved away along the longitudinal axis from the working device and the carriage element still fastened thereto in order to replace the sliding element. The channels particularly, preferably run parallel to one another. At least one of the channels is in each case particularly, preferably formed from each of the carriage elements. In each case at least one of the channels particularly, preferably passes through in each case one of the subareas, such that at least one of the channels in each case passes through each of the subareas. When the channel passes through the subarea, the channel opens into the subarea. The working device may accordingly be fastened within the subarea by said channel.

The invention further relates to a plain bearing assembly comprising a plain bearing according to the invention and a rail, wherein the rail is arranged with its guide portion in the sliding opening and rests against the sliding element. The guide portion preferably lies at two of its ends configured radially, i.e., perpendicular to the longitudinal axis, against the sliding element, in particular at four radial ends which are offset from one another in each case by an angle of rotation of 60° about the longitudinal axis. The guide portion is preferably longer by a multiple than the carriage along the longitudinal axis.

The invention further relates to use of a plain bearing assembly according to the invention. In the case of use according to the invention, to replace the sliding element the carriage elements are detached from one another and moved apart from one another along the longitudinal axis, while they are both guided in uninterrupted manner on the guide portion of the rail and the longitudinal portion, formed by the respective carriage element, of the passage engages around this guide portion, in particular over the above-stated advantageous angular range. In the case of use according to the invention, the sliding element is removed completely from the passage of the carriage along the longitudinal axis between the carriage elements, which have been moved apart from one another and remain guided on the guide portion of the rail, and replaced by a new sliding element. Removal from the passage may proceed, for example, in that the sliding element remains in the longitudinal portion of the passage formed by one of the carriage elements while the other of the carriage elements is moved apart from the one carriage element, after which the sliding element is also removed from this longitudinal portion of the passage formed by the one of the carriage elements. The sliding element is replaced by a new sliding element, by introducing the new sliding element into the passage of the carriage after removal of the sliding element between the carriage elements, in relation to a direction along the longitudinal axis, after which the carriage elements are connected together and fixed to one another, thereby fixing the position of the new sliding element relative to the carriage. The new sliding element is thus guided between the carriage elements in relation to a direction along the longitudinal axis, until it is arranged and aligned with the longitudinal portions of the passage formed by the carriage elements, after which the carriage elements are moved toward one another along the longitudinal axis and the sliding element is received into said longitudinal portions of the passage, such that the sliding element is introduced into the passage of the carriage along the longitudinal axis.

Features which have been described with reference to the plain bearing according to the invention or the use according to the invention may mutatis mutandis be provided for the use according to the invention or the plain bearing according to the invention. It should further be pointed out that the designations "the one carriage element" and "the other carriage element" are used at all times only in the direct context of distinguishing the two carriage elements from one another. The features described in the respective context with reference to "the one" or "the other" carriage element may alternatively be provided in the case of either one of the two carriage elements, such that the designations "the one" and "the other" are interchangeable.

BRIEF DESCRIPTION OF THE DRAWINGS

The invention is explained in more detail below on the basis of an exemplary embodiment with reference to two figures, in which.

DETAILED DESCRIPTION OF THE INVENTION

Figure 1:
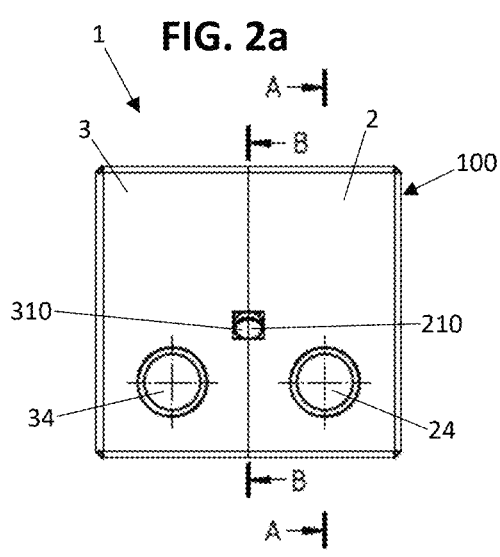
FIG. 1: is a schematic diagram of one exploded drawing of a plain bearing according to the invention.

FIG. 1 shows, in a schematic diagram, an exploded drawing of an embodiment of a plain bearing 1 according to the invention. The plain bearing 1 comprises a carriage, formed by a first carriage element 2 and a second carriage element 3. The plain bearing 1 furthermore has a sliding element 4. The sliding element 4 has a shell part 40, which is formed in the manner of a hollow cylinder interrupted by a slot running along the longitudinal axis X. A projection assembly 41 is provided on the radial outer side of the shell part 40. The projection assembly 41 is provided in the longitudinal center of the shell part 40, which is generally advantageous according to the invention. FIG. 1 shows an exploded drawing and thus not the plain bearing 1 in its intended state. It is however apparent from FIG. 1 that the carriage elements 2, 3 in each case form a longitudinal portion of a passage 9 of the carriage, into which a portion, in each case one longitudinal portion, of the sliding element 4 may be inserted along the longitudinal axis X, wherein on its radial inner side the sliding element 4 forms a sliding opening for receiving a cylindrical guide portion of a rail. Both the carriage elements 2, 3 and the sliding element 4 enclose the longitudinal axis X over an angular range, in relation to an angle of rotation about the longitudinal axis X, of over 240°. It is moreover apparent that the carriage elements 2, 3 in each case form a portion of a groove, in which, in the intended, assembled state of the carriage, the projection assembly 41 is received, whereby the longitudinal position of the shell part 4 is clearly fixed relative to the carriage elements 2, 3. The carriage elements 2, 3 additionally in each case have a channel 24, 34, which extends perpendicular to the longitudinal axis X and passes through a subarea formed by the respective carriage element 2, 3. The subareas formed by the carriage elements 2, 3 are in each case planar and, in the assembled state of the carriage, as apparent from FIG. 2a, together form a planar supporting surface for a working device. It is moreover apparent from FIG. 1 that, to fix the relative position of the carriage elements 2, 3 perpendicular to the longitudinal axis X, pegs 22 are provided which are inserted into blind hole-type indents which are provided at the mutually facing longitudinal ends of the two carriage elements 2, 3. FIG. 1 merely shows one of the blind hole-type indents of the first carriage element 2. The plain bearing 1 further comprises a screw 5, which extends through a hole 23 provided in the first carriage element 2 and is screwed, as intended, into the second carriage element 3, such that its screw head presses against the first carriage element 2 and fixes the two carriage elements 2, 3 to one another in relation to their relative positions on the longitudinal axis X.

Figure 2A:
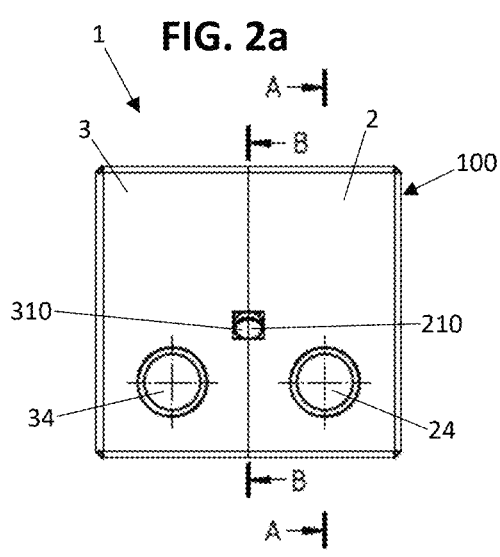
FIG. 2: shows, in different schematic diagrams, different views of components of the embodiment of a plain bearing according to the invention as shown in FIG. 1.
Figure 2B:
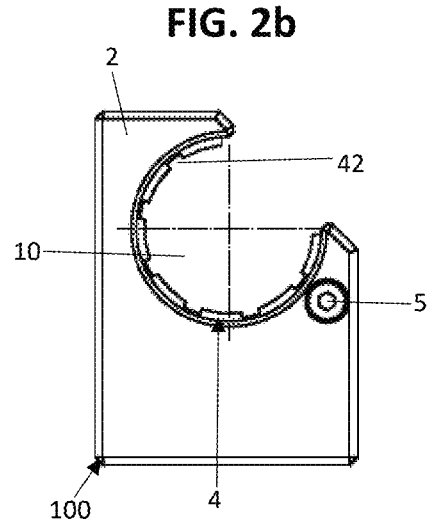

FIG. 2, which comprises FIGS. 2a, 2b, 2c and 2d, shows various views of the plain bearing 1. The plain bearing 1 is illustrated in its intended state, in which the carriage elements 2, 3 forming the carriage 100 are fixed in position to one another. FIG. 2a shows a view from above onto the supporting surface provided to support a working device, said support surface being formed jointly by the carriage elements 2, 3, with the channels 24, 34 provided in the carriage elements 2, 3 passing therethrough. FIG. 2a additionally shows the recess formed by the two carriage elements 2, 3 with in each case one recess portion 210, 310, which recess opens into the passage 9 formed by the carriage 100 and is explained in greater detail in connection with FIG. 2c. FIG. 2b is a view along the longitudinal axis X onto the first carriage element 2 of the plain bearing 1 according to FIG. 2a. It is clear from FIG. 2b that the screw 5 presses with its screw head against the first carriage element 2 to fix its longitudinal position relative to the second carriage element 3, and that the sliding element 4 is arranged in the passage formed by the carriage 100, which sliding element encloses with its radial inner side a sliding opening 10 lying within the passage 9, here over an angular range about the longitudinal axis X of more than 260°. It is additionally clear from FIG. 2b that the sliding element 4 has flutes 42, which are in each case provided between two portions of the sliding element 4 which are provided to rest against a cylindrical guide portion of a rail.

Figure 2C:
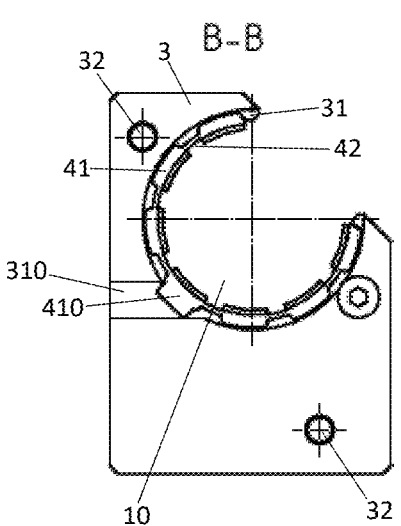
Figure 2D:
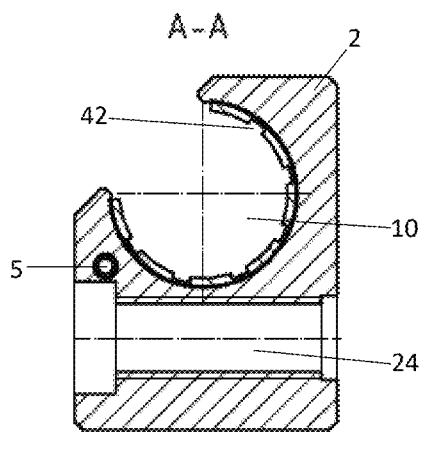

FIGS. 2c and 2d show the views B-B and A-A indicated in FIG. 2a. It is apparent from FIG. 2c that, perpendicular to the longitudinal direction, the projection assembly 41 of the shell part 40 overlaps with the second carriage element 3, such that the second carriage element 3 forms a limit stop 31 which, together with the limit stop 21 of the first carriage element 2, shown in FIG. 1, fixes the longitudinal position of the projection assembly 41 and thus also of the sliding element 4 as a whole relative to the carriage 100. It is moreover apparent from FIG. 2c that the projection assembly 41 comprises a projection portion formed as an antitwist portion 410 which opens into the partial recess 310 formed by the second carriage element 3 and also, albeit not shown in FIG. 2c, into the partial recess 210 formed by the first carriage element 2. The recess formed by the partial recesses 210, 310 thus forms further limit stops of the carriage 100, between which the antitwist portion 410 is arranged. These further limit stops act with respect to a direction perpendicular to the longitudinal direction. By arranging the antitwist portion 410 in said recess, a rotational position of the sliding element, in relation to rotation about the longitudinal axis, is fixed relative to the carriage 100. FIG. 2c additionally shows the blind hole-type indents 32 on the side of the second carriage element 3 facing toward the first carriage element 2, into which the pegs 22 shown in FIG. 1 engage to fix a relative rotational position of the carriage elements 2, 3 relative to one another, in relation to rotation about the longitudinal axis X. FIG. 2b shows a section through the channel 24 of the first carriage element 2. FIG. 2d shows the threaded pin of the screw 5 extending through the first carriage element 2. Furthermore, FIG. 1 shows the sliding opening 10 formed by the sliding element 4 and the flutes 42, which are provided on the radial inner side of the sliding element 4.

LIST OF REFERENCE SIGNS

1 Plain bearing
2 First carriage element
3 Second carriage element
4 Sliding element
5 Screw
9 Passage
10 Sliding opening
21 Limit stop
22 Peg
23 Hole
24 Channel
31 Limit stop
32 Blind hole-type indent
34 Channel
40 Shell part
41 Projection assembly
42 Flute
100 Carriage
210 Partial recess
310 Partial recess
410 Antitwist portion
X Longitudinal axis

The invention claimed is:

1. A plain bearing (1) comprising:
a carriage (100), having a carriage body with a passage (9) running along a longitudinal axis (X); and
a sliding element (4) resting against the carriage body and arranged in the passage (9), the sliding element, at least in portions, enclosing a sliding opening (10) situated within the passage (9), the sliding opening is configured to receive a cylindrical guide portion of a rail extending along the longitudinal axis (X), and wherein the carriage body has two carriage elements (2, 3) arranged next to one another along the longitudinal axis (X) and fixed detachably to one another, each of the two carriage elements (2, 3) forming a longitudinal portion of the passage (9), wherein each of the two carriage elements (2, 3) forms a limit stop, acting along the longitudinal axis, for the sliding element (4), and wherein at least one portion of the sliding element (4) is fixed in position along the longitudinal axis (X) between these limit stops.

2. The plain bearing (1) according to claim 1, wherein the two carriage elements (2, 3) being detached and moved apart from one another along the longitudinal axis is necessary to remove the sliding element (4) from the passage (9) without radial compression.

3. The plain bearing (1) according to claim 2, wherein the two carriage elements (2, 3) and the sliding element (4) are configured in such a manner when the cylindrical guide portion of the rail is received in the sliding opening (10) and has a diameter such that the rail rests against the sliding element (4), the two carriage elements (2, 3) are movable, upon detachment from one another, apart from one another along the longitudinal axis (X) while being guided on the guide portion of the rail by the respective longitudinal portion of the passage (9), wherein the sliding element (4) remains arranged at one of the two carriage elements (2, 3) until the other one of the two carriage elements (2, 3) is spaced from the sliding element (4) along the longitudinal axis (X), wherein thereafter the sliding element (4) is removable from the one carriage element (2, 3) along the longitudinal axis (X).

4. The plain bearing (1) according to claim 1, wherein the passage (9) and the sliding element (4) each encloses the longitudinal axis (X) over an angular range of at least 200°.

5. The plain bearing (1) according to claim 1, wherein the sliding element (4) has a shell part (40) which is configured in the manner of a hollow cylinder interrupted by a slot running along the longitudinal axis (X) and forming the sliding opening (10) with a radial inner side, wherein a projection assembly (41) running around the longitudinal axis (X) is formed on a radial outer side of the shell part (40) and is arranged at least in part along the longitudinal axis (X) between the limit stops (21, 31) formed by the two carriage elements (2, 3).

6. The plain bearing (1) according to claim 5, wherein the projection assembly (41) has a plurality of projection portions arranged distributed about the longitudinal axis (X), wherein at least one of the projection portions is configured as an antitwist portion (410) and is arranged between two further limit stops of the carriage (100) acting perpendicular to the longitudinal direction and being spaced from one another in a direction of rotation about the longitudinal axis (X) in order to fix a rotational position of the sliding element (4) relative to the carriage (100) in relation to rotation about the longitudinal axis (X).

7. The plain bearing (1) according to claim 6, wherein the carriage (100) has a recess which opens into the passage (9), wherein the antitwist portion (410) of the sliding element (4) is arranged in the recess.

8. The plain bearing (1) according to claim 7, wherein the recess forms a continuous connection from an outer side of the carriage (100) to the passage (9).

9. The plain bearing (1) according to claim 5, wherein the sliding element (4) has flutes running along the longitudinal axis (X) on the inner side of the shell part (40).

10. The plain bearing (1) according to claim 5, wherein the carriage elements (2, 3) together form, at their ends facing one another along the longitudinal axis (X), a groove running around the longitudinal axis (X) that forms the limit stops (21, 31) of the two carriage elements (2, 3), wherein the projection assembly (41) is arranged at least in part in the groove.

11. The plain bearing (1) according to claim 1, wherein the two carriage elements (2, 3) are each formed in one piece and are made from a metal or a metal alloy.

12. The plain bearing (1) according to claim 1, wherein the sliding element (4) is made from a tribopolymer.

13. The plain bearing (1) according to claim 1, wherein at least one peg (22), which extends along the longitudinal axis (X), is fixed on a side of the one of the two carriage elements (2, 3) facing the other of the two carriage elements (2, 3), wherein the peg (22) engages in a hole-type indent (32), which is provided on the side of the other carriage element (2, 3) facing toward the one of the two carriage elements (2, 3), to fix a rotational position of the two carriage elements (2, 3) relative to one another in relation to rotation about the longitudinal axis (X).

14. The plain bearing (1) according to claim 1, further comprising a screw (5) extending along the longitudinal axis (X) and having a screw head attached to a threaded pin, wherein the screw head is pressed along the longitudinal axis (X) against an outer side of one of the two carriage elements (2, 3) and the threaded pin extends from the screw head through this one carriage element (2, 3) of the two carriage elements (2, 3) and is screwed into a threaded hole provided in the other one of the two carriage elements (2, 3).

15. The plain bearing (1) according to claim 1, wherein the carriage (100) has at least one channel (24, 34) running perpendicular to the longitudinal axis (X) for receiving a fastening means for fastening a working device to the carriage (100).

16. A plain bearing assembly comprising a plain bearing (1) according to claim 1, and a rail, wherein the rail is arranged with the cylindrical guide portion in the sliding opening (10) and rests against the sliding element (4).

17. A method of replacing a sliding element of a plain bearing of a plain bearing assembly according to claim 16, the method comprising:

in a first step, detaching the two carriage elements (2, 3) from one another and moving apart the two carriage elements from one another along the longitudinal axis (X), while the two carriage elements are both guided in uninterrupted manner on the cylindrical guide portion of the rail and the longitudinal portion of the passage (9) formed by a respective one of the two carriage elements (2, 3), engages around this guide portion, in a second step following the first step, completely removing the sliding element (4) from the passage of the carriage (100) along the longitudinal axis (X) between the two carriage elements (2, 3), which have been moved apart from one another and are still guided on the cylindrical guide portion of the rail, in a third step following the second step, introducing a new sliding element (4) as a replacement into the passage of the carriage (100), and in a fourth step following the third step, connecting and fixing together the two carriage elements (2, 3) to one another, thereby fixing the position of the new sliding element (4) relative to the carriage (100).

18. The plain bearing assembly according to claim 15, wherein the cylindrical guide portion is longer by a multiple than the carriage (100) along the longitudinal axis (X).

* * * * *